United States Patent [19]

Sukimoto et al.

[11] Patent Number: 4,580,208

[45] Date of Patent: Apr. 1, 1986

[54] PID CONTROLLING METER

[75] Inventors: Yasuyuki Sukimoto, Yahata; Toshiaki Nagao, Muko, both of Japan

[73] Assignee: Omron Tateisi Electronics Co., Kyoto, Japan

[21] Appl. No.: 510,250

[22] Filed: Jul. 1, 1983

[30] Foreign Application Priority Data

Jul. 5, 1982 [JP] Japan ................................ 57-116395

[51] Int. Cl.⁴ ...................... G06F 15/46; G05B 11/42
[52] U.S. Cl. .................................... 364/162; 318/610; 364/188
[58] Field of Search ............... 364/160, 161, 162, 157, 364/188, 189; 318/609, 610, 561

[56] References Cited

U.S. PATENT DOCUMENTS

| | | | |
|---|---|---|---|
| 3,786,242 | 1/1974 | Brooks | 364/162 X |
| 3,947,665 | 3/1976 | Hundley | 364/162 X |
| 3,976,981 | 8/1976 | Bowden | 364/160 X |
| 4,218,733 | 8/1980 | Maselli | 364/189 X |
| 4,418,381 | 11/1983 | Molusis et al. | 364/162 X |

*Primary Examiner*—Joseph Ruggiero
*Attorney, Agent, or Firm*—Stevens, Davis, Miller & Mosher

[57] ABSTRACT

A PID controlling meter is provided with unit for displaying an amount of operation representing the sum total of the bias constant and the operation result of three terms, i.e., a proportional term, an integrating term and differentiating term each of which is a function of deviation. The meter also has a constant setting unit for setting displayed amount of operation as a control parameter; unit for displaying set values of the constant setting a unit; a unit for reading the set values of the constant setting unit when a power source is closed; and a unit for determining bias constant when the power source is closed on the basis of the constant set values read by the reading unit.

3 Claims, 3 Drawing Figures

PID CONTROLLING METER

BACKGROUND OF THE INVENTION

This invention relates to a PID controlling meter, and more particularly, to a technique for controlling overshoot generated when a power source is closed.

As is well known, PID controlling meters have advantages in that less steady state deviation occurs and in that correction of disturbance can be quickly accomplished, and therefore, PID controlling meters are extensively used for various process controls such as temperature control.

In PID controlling meters of this kind, over-shoot often occurs in control operations performed when a power source is closed. This results from the fact that when the power source is cut off, the integrated values so far presented are lost and when the power source is again closed, integrating operation restarts from an initial integrating value (normally, zero) and as a consequence, the number of required integration operations increases. To minimize such over-shoot and to shift the condition to the previous stabilized control condition quickly, the integrated value from outside need merely be corrected, but to perform a correcting operation upon every closure of the power source is very cumbersome and operability is poor.

In view of the foregoing, in prior art PID controlling meters, an antireset wind up function is utilized wherein an amount of upper limit operation and an amount of lower limit operation in the range capable of being integrated are determined from the amount of operation under the stabilized control condition, and the integrating operation is effected only when the amount of operation is within said range when the power source is reclosed, wherby the over-shoot resulting from over-integration is minimized to eliminate the necessity of a correcting operation by the user.

However, PID controlling meters which use antireset wind-up functions have the following problems.

First, since the integrating operation is not performed when the amount of operation is other than the above described set range, said set range has to be extended to prevent an increase in steady-state deviation due to the influence of disturbances. This is not favorable in terms of the initial object which is to minimize overshoot. In addition, in order to determine the above described set range, a high degree of expertise is required using data for obtaining the stabilized control condition in respect of objects to be controlled and also data concerning the condition disturbance and bringing appropriate judgment on the basis of said data. Thus, it is not possible for the user to simply make a decision. Finally, two kinds of settings are necessary, thus making the structure of the controlling meter quite complex.

SUMMARY OF THE INVENTION

It is an object of the present invention to provide a PID controlling meter which can minimize over-shoot without complicating the structure of the controlling meter and with a simple setting operation.

In accordance with the present invention, values displayed on the controlling meter are merely set to a single setting unit, and therefore, the setting operation is simple and the structure of the controlling meter is not complex.

Moreover, bias constant is to be determined on the basis of the amount of operation under the stabilized control condition obtained in the early stage of operation, and therefore, the over-shoot generated when the power source is closed in the operations performed after the second operation and thereafter, can be reduced.

Other and further objects of this invention will become apparent upon an understanding of the illustrative embodiments described below or will be indicated in the appended claims, and various advantages not referred to herein will occur to one skilled in the art upon employment of the invention in practice.

DETAILED DESCRIPTION OF THE INVENTION

As is well known, the control operation of a PID controlling meter is given by $$M = Kp \cdot e + \Sigma Ki \cdot e + Kd \frac{de}{dt} + M0 \tag{1}$$

where M refers to the amount of operation. In Equation (1), Kp represents the proportional gain, Ki the integrating gain, Kd the differentiating gain, e the deviation, and M0 the bias constant.

Under the stabilized control condition, a temperature detector has a value approximately equal to a target value, and in this case, it can be assumed that $e \approx 0$ and $(de)/(dt) \approx 0$ i.e., that these values are approximately equal to 0. Therefore, Equation (1) is given by $$\begin{aligned} M &= \Sigma Ki \cdot e + M0 \\ &= Ma + M0 \end{aligned} \tag{2}$$

where Ma represents the integrated value leading to the stabilized control condition.

So, the Ma ($Ma = M - M0$) is utilized as the bias constant when the power source is closed, and the integrating gain is decreased until the value draws near the target value for the PID control condition. In this way, control is carried out so that the magnitude of over-shoot being previously generated may be minimized, and the control operation can be quickly shifted to the previous stabilized control condition. This can also be applied to the case where the target value is changed to obtain a new stabilized control condition.

The PID controlling meter of the present invention has been achieved in view of the above mentioned fact and comprises means for displaying said amount of operation m, a constant setting unit for setting the amount of operation M as a control parameter, means for displaying the set value Mc of said constant setting unit, means for reading the set value Mc of the constant setting unit when the power source is closed, and means for determining said bias constant Ma at the time of closing the power source on the basis of said constant setting value Mc read by said reading means.

A specific embodiment is described below.

Figure 1:
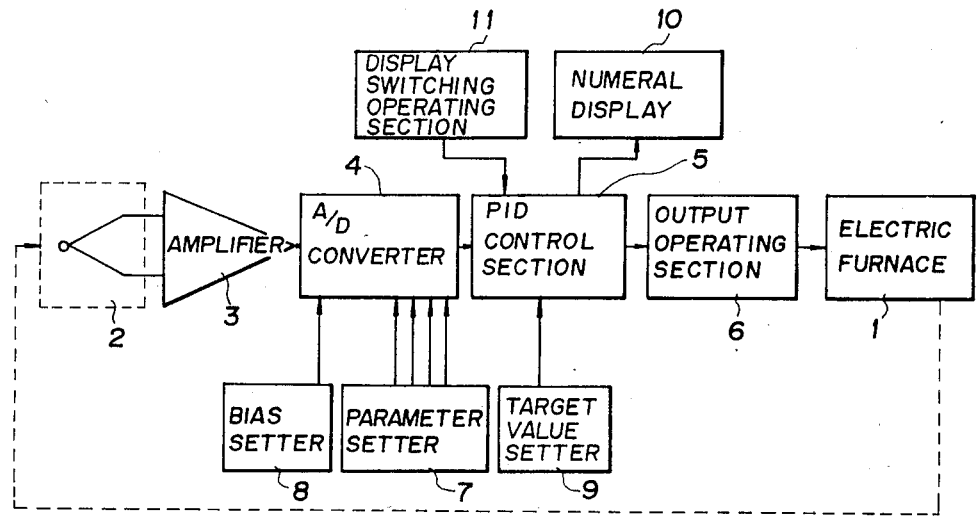
FIG. 1 is a schematic block diagram showing the basic structure of a PID controlling meter in accordance with the present invention.

FIG. 1 is a schematic block diagram showing a PID controlling meter to which the present invention is applied. In FIG. 1, the present apparatus basically comprises a detector 2 for detecting a temperature of an electric furnace 1 as an object to be controlled, an amplifier 3, an A/D converter 4, a PID controlling section 5, and an output operating section 6. The A/D converter 4 is provided with setting units 7 and 8 for setting a PID control parameter and said bias constant Ma in the form of an analog amount. The PID control section 5 is provided with a digital setting unit 9 for setting a target temperature. a numeral display 10 and a display switching section 11.

The numeral display 10 displays the detected temperature value of the electric furnace 1, the set value of the setting units 7, 8, 9, and said amount of operation M obtained as the result of operation of the PID control section 5. Switching of said display is carried out by the switching operating section 11.

The PID control section 5 is composed of a microcomputer and comprises a central processing unit (CPU) for executing said PID operation and the aforesaid various means in accordance with the present invention, a ROM for storing system programs, and a RAM which functions as a working memory.

Figure 2:
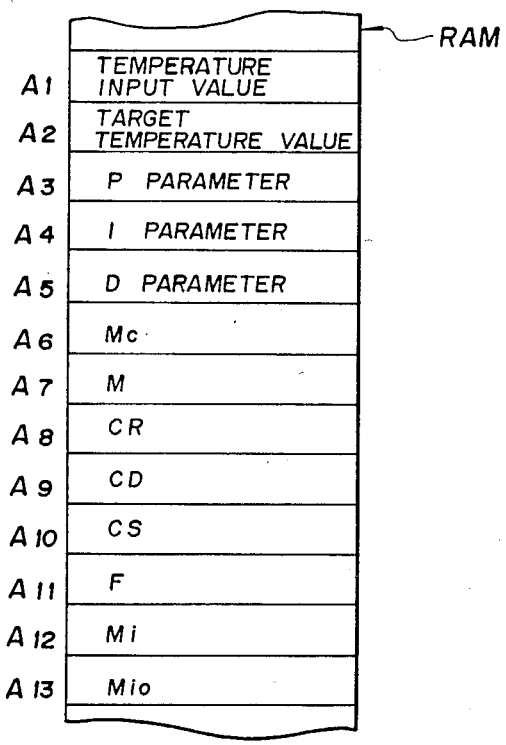
FIG. 2 shows the structure of a RAM attaching importance to parts of the present invention.

FIG. 2 shows the structure of said RAM, which is shown attaching importance to parts of the present invention. In FIG. 2, reference character A1 denotes a temperature input value storage area, A2 a target temperature value storage area, A3, A4 and A5 storage areas for storing parameters of PID control, respectively, A6 a storage area for storing values of bias constant (Mc), A7 a storage area for storing values of an amount of operation M, A8 a reading counter (CR) area, A9 a display counter (CD) area, A10 a sampling counter (CS) area, A11 a storage area for storing a flag (F) for discriminating closure of power source, A12 a storage area for storing values of operation constant (Mi), and A13 a storage area for storing values of an amount of stabilized operation (Mi0).

Figure 3:
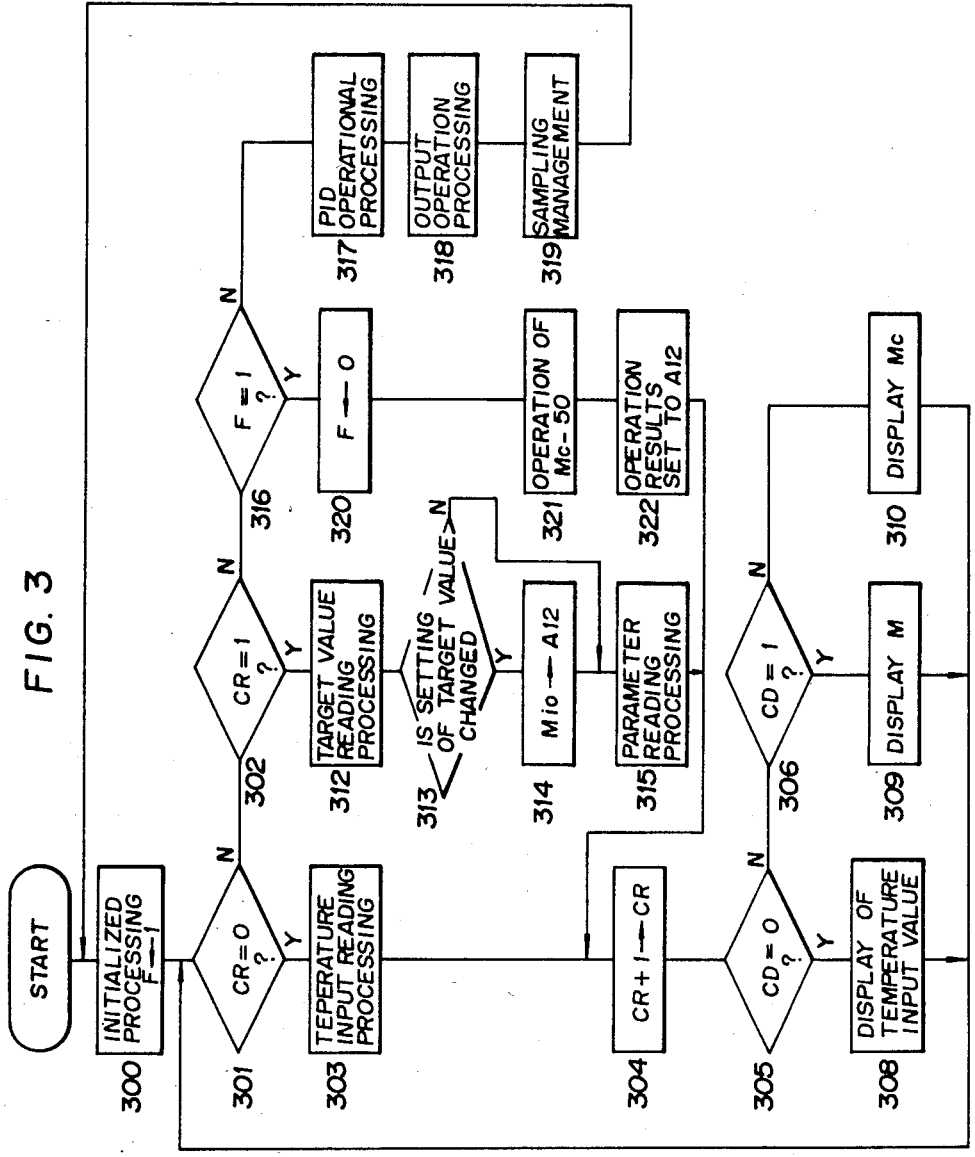
FIG. 3 is a flow chart showing the control operation of a PID controlling meter attaching importance to parts of the present invention.

FIG. 3 is a flow chart showing the control operation carried out by the PID control section 5 attaching importance to part of the present invention. A description will be made hereinafter in accordance with this flow chart.

When the power source is closed, the known initialized processing is executed in Step 300. At this time, the flag F for discriminating the closure of the power source is set.

Thereafter, routines (Steps 301, 302) for retrieving counted values of reading counter CR are executed. Reading counter CR is provided to divide sampling time by a value stored in sampling counter CS to designate the routines of control operation carried out by the PID control section 5, said operation being repeatedly carried out every sampling time.

When CR=0 is detected in Step 301, operation proceeds to Step 303 where the temperature input value is stored in the storage area A1 of RAM, and the reading counter CR is incremented in step 304.

Subsequent Steps 305, 306 involve routines for retrieving the counted values of the display counter CD. The counted value of the display counter CD is incremented and set by a push-button switch provided on the display switching operating section 11. Thereby, display routines of display of temperature input value (Step 308), display of an amount of operation (Step 309) and display of bias constant set value MC (Step 310) are executed for the numeral display 10.

When CR=1 is detected in Step 302, the target temperature value reading routine (Step 312) is executed, with the control operation then proceeding to Step 313.

Step 313 involves a routine for judging whether or not the setting of the target temperature value has been changed. If the set value has not been changed, operation proceeds to Step 315 while jumping Step 314 to read parameters set in the setting units 7 and 8, with the control operation then proceeding to Step 304.

When CR=2 is detected in Step 302, operation proceeds to Step 316. Step 316 involves the routine for judging whether or not the flag F for discriminating power source closure is set, said flag F being set when the power source is re-closed (Step 300). As a result, routines of Steps 317, 318 and 319 are executed unless the flag F is set, with control operation returning to the initial Step 300.

The above described routines are repeatedly executed, in the PID operation processing routine of Step 317 in said process, the amount of operation M shown in Equation (1) is successively calculated and controlled so that the temperature of the electric furnace may be stabilized at the target temperature. After the stabilized control condition has been passed for a given time (for example, continued for a duration of one minute under the condition that deviation is within 0.3° C.), a value representing the amount of stabilized operation $Mi0$ is transferred to the storage area A13 of the RAM. At this time, the bias constant M0 shown in Equation (1) is preset to 50%

In this way, if the stabilized control condition has been obtained, the push-button switch of the display switching operating section 11 is operated to obtain CD=1. Then the amount of stabilized operation $Mi0$ is displayed on the numeral display 10 by means of the routine of Step 309. The operator operates the push-button switch to have CD=2 in order to set the aforesaid value to the bias constant settin unit 8. As a consequence, the set value Mc is displayed on the numeral display 10 in Step 310, and therefore the operator can confirm and correct the set value. This set value Mc is stored in RAM in the routine of Step 315. This bias constant setting unit 8 comprises a volume or the like, which display unit of graduations is made the same as that of the numeral display 10 so as to minimize an extent wherein correction is made in the operation of confirmation.

Next the case will be described in which the determined work is finished, the power source of the PID controlling meter is opened and the power source for subsequent work is re-closed. In this case, the flag F for determining the closure of power source is set in the initialized processing routine 300, and therefore, this can be detected in Step 316 in the initial sampling time, with flag F being set in Step 320 control operation then proceeds to Step 321. In Step 321, operation is performed to obtain Mc-50. The result of this operation is stored (as operation constant $Mi0$) in the RAM storage area A12 in Step 322.

Now, F is reset (F=0) in Step 316 within the same initial sampling time, and therefore, temperature control routines after Step 317 are executed. In the PID operation processing routine in Step 317, an operation for obtaining a solution to Equation (1) is carried out, and the bias constant term is determined to be $M0 + Mi = 50 + (Mc - 50) = Mc$. Accordingly, the integrated value under the stabilized control condition can be determined and thus, temperature control at the time of reclosure of the power source is accomplished so as to decrease the over-shoot previously generated.

As described above, in the PID controlling meter of the present invention, the over-shoot at the time of closing the power source in the operations after the second operation can be decreased in a simple procedure wherein the stabilized control condition in the early stage of operation is obtained, and the amount of operation at that time is set to the bias constant setting unit.

Even in the case where a target value is changed to obtain a new stabilized control condition, over-shoot occurs. This is treated in the following manner. When a change of a setting of a target value is detected in Step 313, the amount of stabilized operation Mi0 prior to said change is transferred to the storage area A12 in Step 314, with operation then proceeding to Step 315. Accordingly, in the PID operation processing routine of Step 317, the operation constant, Mi, is utilized as the bias constant in a manner similar to that of the former case, in order to decrease the over-shoot at the time of change in setting.

While in this embodiment, the bias constant setting unit comprises an analog amount setting unit such as a volume, it should be understood of course that said unit in not limited thereto in the present invention, but a digital amount setting unit, such as a digital switch, can also be used.

What is claimed is:

1. A PID controlling meter comprising (a) means for displaying an amount of operation comprising a sum of a first bias constant and an operation result of three terms, said three terms being a proportional term, an integrating term and a differentiating term each being a function of deviation; (b) a second constant setting unit; (c) means for displaying set values of said second constant setting unit; (d) means for reading set values of said second constant setting unit when a power source is closed; and (e) means for setting said bias constant based on set values read by said reading means, wherein a unit of set values of said second constant setting unit is the same as a unit of numerals displayed by said means for displaying an amount of operation.

2. The PID controlling meter according to claim 1 wherein said second constant setting unit comprises an analog amount setting unit.

3. The PID controlling meter according to claim 1 wherein said second constant setting unit comprises a digital amount setting unit.

* * * * *